United States Patent [19]
Shirai et al.

[11] Patent Number: 6,045,265
[45] Date of Patent: Apr. 4, 2000

[54] ROLLING MOTION GUIDE APPARATUS AND METHOD OF MANUFACTURING MOVABLE MEMBER OF ROLLING MOTION GUIDE APPARATUS

[75] Inventors: Takeki Shirai; Tadashi Hirokawa, both of Tokyo, Japan

[73] Assignee: THK Co., Ltd., Tokyo, Japan

[21] Appl. No.: 08/983,340

[22] PCT Filed: May 1, 1997

[86] PCT No.: PCT/JP97/01507

§ 371 Date: Apr. 15, 1998

§ 102(e) Date: Apr. 15, 1998

[87] PCT Pub. No.: WO97/42422

PCT Pub. Date: Nov. 13, 1997

[30] Foreign Application Priority Data

May 2, 1996 [JP] Japan ................................... 8-135887

[51] Int. Cl.⁷ .................................................. F16C 29/06
[52] U.S. Cl. ................................................................ 384/45
[58] Field of Search ................................ 384/43, 44, 45; 464/168

[56] References Cited

U.S. PATENT DOCUMENTS 4,128,279  12/1978  Ernst et al. .
4,659,239  4/1987  Teramachi .

FOREIGN PATENT DOCUMENTS

| 1-176811 | 7/1989 | Japan . |
| 2-142918 | 6/1990 | Japan . |
| 2-142919 | 6/1990 | Japan . |
| 3-144114 | 6/1991 | Japan . |
| 7-208465 | 8/1995 | Japan . |
| 7-317762 | 12/1995 | Japan . |
| 2 282 192 | 3/1995 | United Kingdom . |

*Primary Examiner*—Lenard A. Footland
*Attorney, Agent, or Firm*—Armstrong, Westerman, Hattori, McLeland, & Naughton

[57] ABSTRACT

An object of this invention is to provide a rolling motion guide apparatus and a method of manufacturing a movable member for the apparatus enabling to enhance a working efficiency by sufficiently minimizing the boundary portion between the molding shaped portion and the movable member body. The apparatus and the method are characterized in that a pipe portion (14) for forming a rolling member return passage is integrally provided to an inner periphery portion of a through bore (13) formed so as to penetrate through a movable block body (6), and a boundary portion between a molding die portion and the movable block body (6) is limited to portions, i.e., a portion between an end surface (61) of the movable block body and a round piece portion (16) and a portion between a ball rolling groove (10) and a ball retaining portion (12).

1 Claim, 5 Drawing Sheets

(b)

(c)

(a)

(b)

(c)

(d)

(b)

(a)

(b)

(a)

(b)

(c)

6,045,265

ROLLING MOTION GUIDE APPARATUS AND METHOD OF MANUFACTURING MOVABLE MEMBER OF ROLLING MOTION GUIDE APPARATUS

TECHNICAL FIELD

The present invention relates to a rolling motion guide apparatus in which a movable member is movably assembled to a track shaft through a rolling member, particularly to a structure for an inner periphery guide portion of a rolling member rolling direction changing passage which is integrally formed to a movable member body.

BACKGROUND ART

As an example of the conventional rolling motion guide apparatus of this type, the applicant had already proposed a rolling motion guide apparatus, as disclosed in Japanese Patent Laid-Open Publication No. HEI 7-317762, in which a circulating passage of the rolling member is integrally formed to the movable member body as a molding shaped portion composed of resin or the like.

That is, the movable member has a structure comprising: a movable member body having a loaded rolling member rolling portion corresponding a loaded rolling member rolling portion formed to the track shaft, and a rolling member return passage for returning a rolling member from one end of the loaded rolling member rolling portion to the other end thereof; and a direction changing passage member provided both end portions of the movable member body, the direction changing passage member constituting a rolling member rolling direction changing passage for scooping up the rolling member from the loaded rolling member rolling portion and then guiding the rolling member to the rolling member return passage.

Further, a rolling member retaining portion provided at a side peripheral portion of the loaded rolling member rolling portion, the inner periphery guide portion of the rolling member rolling direction changing passage and the rolling member return passage portion are integrally formed to the movable member body as a molding shaped portion composed of resin or the like (see Japanese Patent Laid-Open Publication No. HEI 7-317762).

However, in a case of the prior art technics described above, a boundary between the molding shaped portion and the movable member body consists of three boundary portions i.e., a boundary portion between both end surfaces of the movable member body and a shaped portion of the direction changing passage inner periphery guide portion, a boundary portion between the rolling member rolling portion and a shaped portion of the rolling member retaining portion formed at both side peripheral portion of the rolling member rolling portion, and a boundary portion between a side surface of the movable member opposing to a side surface to which rolling member rolling portion is formed and a shaped portion of a rolling member return bore. As a result, the three boundary portions are ranged over three side surfaces of the movable member.

When a clearance between the respective boundary portions between the movable member body and the molding shaped portion and a molding die supporting portion are not set to within a predetermined range, burrs will be disadvantageously formed from a molding material, so that it is required to take a countermeasure against the burrs. In this regard, the conventional movable member is inevitably required to take the countermeasure against the burrs with respect to the three side surfaces of the movable member.

Accordingly, the molding die and the movable member were required to be precisely formed so that each of the three side surfaces thereof should have an accurate dimension.

The present invention was conceived for solving the aforementioned problems and an object of the present invention is to provide a rolling motion guide apparatus and a method of manufacturing a movable member for the apparatus enabling to enhance a working efficiency by sufficiently minimizing the boundary portion between the molding shaped portion and the movable member body.

DISCLOSURE OF THE INVENTION

In order to achieve the afore-mentioned object, the present invention provides a rolling motion guide apparatus comprising a track shaft and a movable member movably disposed to the track shaft through a number of rolling members, wherein the movable member comprises: a movable member body having a loaded rolling member rolling portion corresponding to a loaded rolling member rolling portion formed to the track shaft, and a rolling member return passage for returning the rolling member from one end of the loaded rolling member rolling portion to the other end thereof; and a direction changing passage member provided both end portions of the movable member body, the direction changing passage member constituting a rolling member rolling direction changing passage for scooping up the rolling member from the loaded rolling member rolling portion and then guiding the rolling member to the rolling member return passage, wherein a rolling member retaining portion, the direction changing passage inner periphery guide portion and the rolling member return passage constituting portion to be provided at side peripheral portion of the loaded rolling member rolling portion are integrally formed to the movable member body by inserting the movable member body into a molding die, wherein the rolling member return passage constituting portion is integrally provided to an inner peripheral portion of a through bore formed so as to penetrate the movable member body, and wherein boundary portions between each of the rolling member retaining portion, the direction changing inner periphery guide portion, the rolling member return passage constituting portion and the movable member body are limited to portions between an end portion of the movable member body and the direction changing passage inner periphery guide portion and between the rolling member rolling portion and the rolling member retaining portion.

Accordingly, the countermeasure against the burrs is required for only two portions of the end surface of the movable member body and the rolling member rolling groove portion, so that an accuracy in dimension is not required for a portion between a side surface opposing to the side surface of the movable member body to which rolling member rolling groove is formed and the molding die. In this case, the direction changing passage inner periphery guide portions provided at both end portions of the movable member body are connected to the rolling member return passage member through the rolling member retaining portion, so that the direction changing passage inner periphery guide portions are not detachable therefrom.

In addition, in a case where the rolling member retaining portion is not provided to a side peripheral portion of the rolling member rolling groove of the movable member body, the apparatus is characterized in that the boundary portions between the direction changing passage inner periphery guide portion, the rolling member return passage member and the movable member body are limited to portions i.e., a portion between the end portion of the movable member body and the direction changing passage inner periphery guide portion, and a portion between both the end portions of the rolling member rolling portion and the direction changing passage inner periphery guide portion.

According to the structure described above, the portions to be required to take the countermeasure against the burrs are limited to the portions of the end surface of the movable member body and both the end portions of the rolling member rolling portion. In this case, the direction changing passage inner periphery guide portions provided at both end portions of the movable member body are connected by the rolling member return passage member, so that the direction changing passage inner periphery guide portions are not detachable therefrom.

Further, in a case where the rolling member retaining portion is not provided to a side peripheral portion of the rolling member rolling groove of the movable member body and the rolling member return passage is not molding-shaped, the apparatus is characterized in that the boundary portion between the direction changing passage inner periphery guide portion and the movable member body is limited to portions i.e., a portion between both the end portions of the movable member body and the direction changing passage inner periphery guide portion, a portion between both the end portions of the rolling member rolling portion and the direction changing passage inner periphery guide portion, and a portion between both the end portions of the rolling member return passage and the direction changing passage inner periphery guide portion.

According to the structure described above, the portion to be required to take the countermeasure against the burrs is limited to the portions of the end surface of the movable member body, both the end portions of the rolling member rolling portion, and both the end portions of the rolling member return passage.

In this case, when the direction changing passage inner periphery guide portion member is constructed so that both end surfaces of the movable member body are provided with engaging holes and the direction changing passage inner periphery guide portion is provided with an engaging convex portion for locking which is formed from a molding material flowing into the engaging hole, the direction changing passage inner periphery guide portion can be prevented from dropping off.

In this regard, when the engaging hole is formed to be a screwed hole having a thread groove formed at inner periphery portion of the screwed hole and the engaging convex portion is formed to have a male thread groove with which the thread groove of the screwed hole is engaged, the prevention of the dropping-off can be further ensured.

The method of manufacturing a movable member for the rolling motion guide apparatus having a movable member comprising: a movable member body having a loaded rolling member rolling portion corresponding to a loaded rolling member rolling portion formed to the track shaft, and a rolling member return passage for returning a rolling member from one end of the loaded rolling member rolling portion to the other end thereof; and a direction changing passage member provided both end portions of the movable member body, the direction changing passage member constituting a rolling member rolling direction changing passage for scooping up the rolling member from the loaded rolling member rolling portion and then guiding the rolling member to the rolling member return passage; the method characterized by comprising the steps of:

forming a through bore for forming the rolling member return passage to the movable member body;

supporting the movable member body within a molding die with reference to the end surfaces and the rolling member rolling portion of the movable member body, and setting each of contact conditions between the end surface of the movable member body and an end surface supporting portion of the molding die and between the rolling member rolling portion of the movable member body and a rolling member rolling portion supporting portion to a contact condition enabling to shut off a circulation of the molding material therebetween;

forming a cavity for forming the direction changing passage inner periphery guide portion at a portion between the end portion of the movable member body and the end surface supporting portion of the molding die, forming a cavity for forming the rolling member retaining portion at a portion between the rolling member rolling portion of the movable member body and a side periphery portion of a rolling member rolling portion supporting portion of the molding die, and forming a cavity for forming the rolling member return passage at a portion between a core pin to be inserted into the through bore of the movable member body and the inner periphery portion of the through bore; and injecting the molding material into the respective cavities for forming the direction changing passage inner periphery guide portion, the rolling member retaining portion and the rolling member return passage, thereby to integrally form the direction changing passage inner periphery guide portion, the rolling member retaining portion and the rolling member return passage to the movable member body.

According to the molding method described above, each of positions of the direction changing passage inner periphery guide portion, the rolling member retaining portion and the rolling member return passage is determined with reference to the rolling member rolling portion. Therefore, each of joint portions between the rolling member rolling portion and the direction changing passage inner periphery guide portion and between the direction changing passage and the rolling member return passage can be formed as a continuous surface having no difference in level, so that smooth circulation and movement of the rolling member can be effectively secured.

In another aspect of the present invention of a case where the rolling member retaining portion is not provided at the side peripheral portion of the rolling member rolling groove of the movable member body, the method comprises the steps of:

forming a through bore for forming the rolling member return passage at the movable member body;

supporting the movable member body within a molding die at both the end surfaces of the movable member body and an end portion of the rolling member rolling portion, and setting each of contact conditions between the the end surface of the movable member body and an end surface supporting portion of the molding die and between the rolling member rolling portion of the movable member body and a rolling member rolling portion end supporting portion of the molding die to a contact condition enabling to shut off a circulation of the molding material therebetween;

forming a cavity for forming the direction changing passage inner periphery guide portion at a portion between the end portion of the movable member body and the end surface supporting portion of the molding die and forming a cavity for forming the rolling member return passage at a portion between a core pin to be inserted into the through bore of the movable member body and the inner periphery portion of the through bore; and injecting the molding material into the respective cavities for forming the direction changing passage inner periphery guide portion and the rolling member return passage, thereby to integrally form the direction changing passage inner periphery guide portion and the rolling member return passage to the movable member body.

Furthermore, in another aspect of this invention of a case where the rolling member retaining portion is not provided to a side peripheral portion of the rolling member rolling groove of the movable member body and the rolling member return passage is not constituted by the molding-shaped portion, the method is characterized by comprising the steps of:

supporting the movable member body within a molding die at both the end surfaces of the movable member body and an end portion of the rolling member rolling portion, and setting each of contact conditions between the end surface of the movable member body and an end surface supporting portion of the molding die, between an end portion of the rolling member rolling portion of the movable member body and a rolling member rolling portion end supporting portion of the molding die and between an end portion of the rolling member return passage of the movable member body and an return passage end supporting portion of the molding die to a contact condition enabling to shut off a circulation of the molding material therebetween;

forming a cavity for forming the direction changing passage inner periphery guide portion at a portion between the end portion of the movable member body and the end surface supporting portion of the molding die; and injecting the molding material into the cavity for forming the direction changing passage inner periphery guide portion, thereby to integrally form the direction changing passage inner periphery guide portion to the movable member body.

BRIEF DESCRIPTION OF THE DRAWINGS

FIG. 1 is a view showing one embodiment of a rolling motion guide apparatus according to the present invention, in which FIG. 1(a) is a cross sectional view of the apparatus, FIG. 1(b) is a side view of the apparatus and FIG. 1(c) is a cross sectional view showing a direction changing passage of the apparatus.

FIG. 2 is a view showing a movable block body of the apparatus according to the present invention, in which FIG. 2(a) is a view showing an end surface of the movable block body, FIG. 2(b) is a side view of the movable block body, FIG. 2(c) is a rear end view showing a part of a direction changing passage of the movable block body and FIG. 2(d) is a cross sectional view taken along the line D—D of FIG. 2 (a).

FIG. 4 is a view showing another embodiment of a rolling motion guide apparatus according to the present invention in which FIG. 4(a) is a front view, half in section, showing a movable block body and FIG. 4(b) is a view showing a construction of a molding die for forming a round piece portion.

FIG. 5 is a view showing still another embodiment of a rolling motion guide apparatus according to the present invention in which FIG. 5(a) is a front view, half in section, showing a movable block body, FIG. 5(b) is a view showing a construction of a molding die for forming a round piece portion and FIG. 5(c) is a cross sectional view showing a construction in which an engaging convex portion is provided to the round piece portion.

BEST MODE FOR EMBODYING THE INVENTION

In order to explain the present invention in more detail, the preferred embodiments of this invention will be described hereunder with reference to the accompanying drawings.

Figure 1:
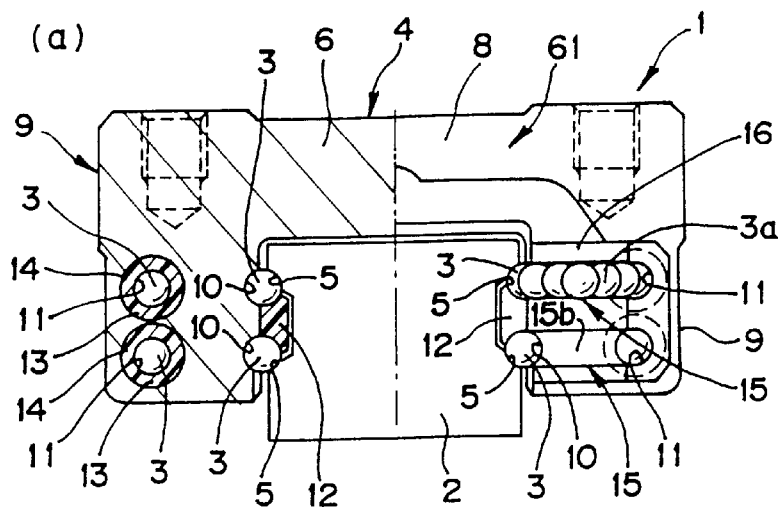
Figure 1:
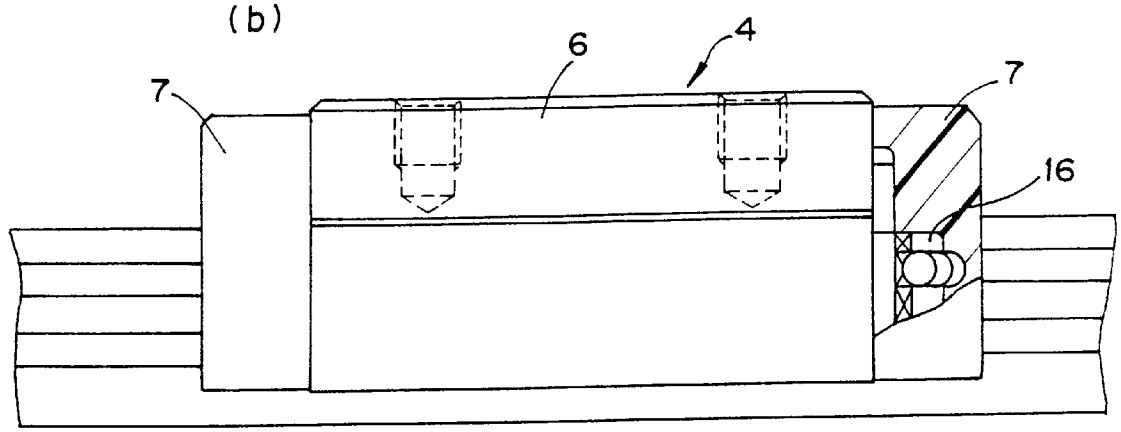
Figure 1:
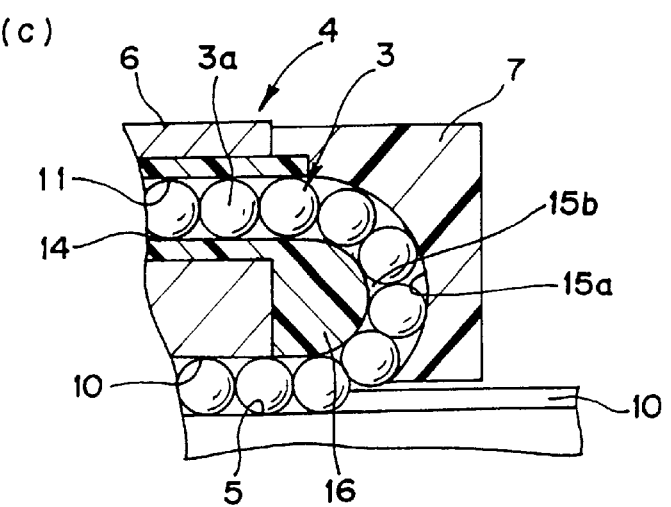
Figure 2:
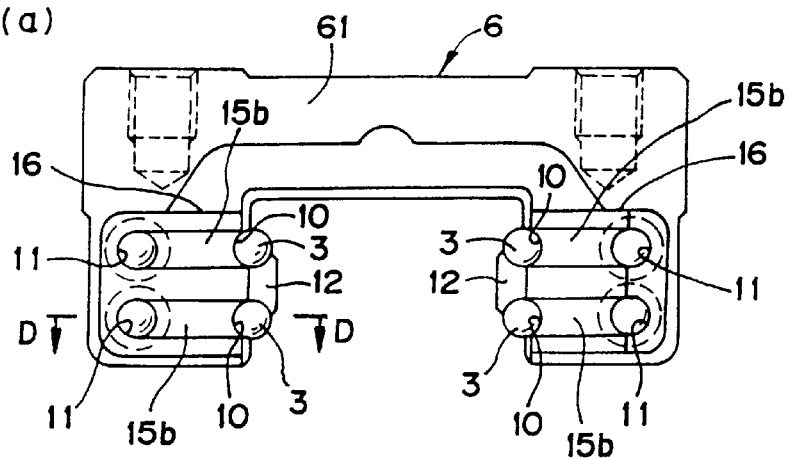
Figure 2:
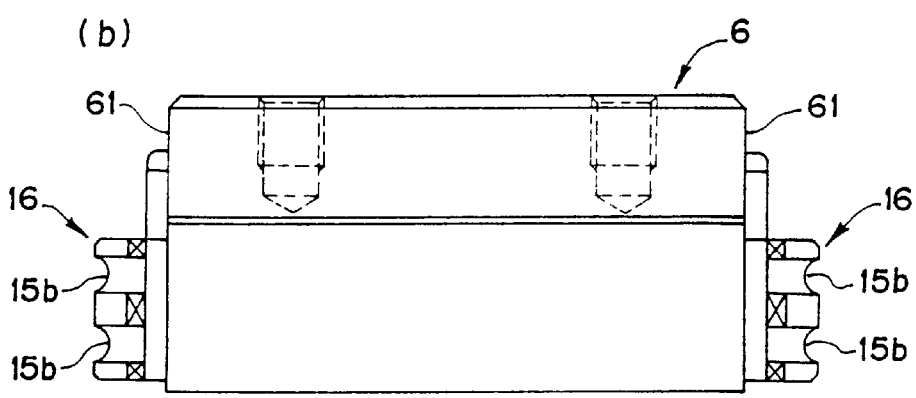
Figure 2:
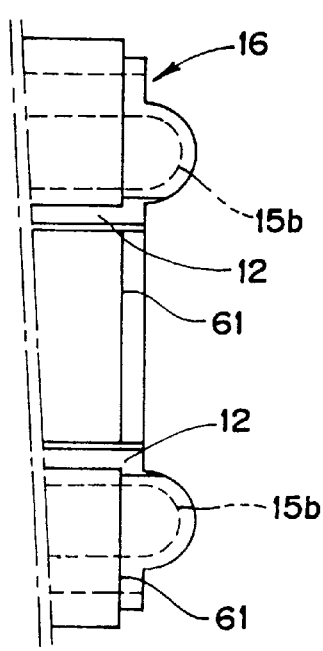
Figure 2:
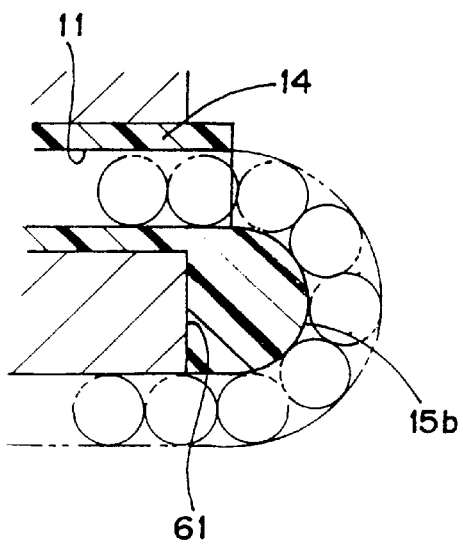
Figure 3:
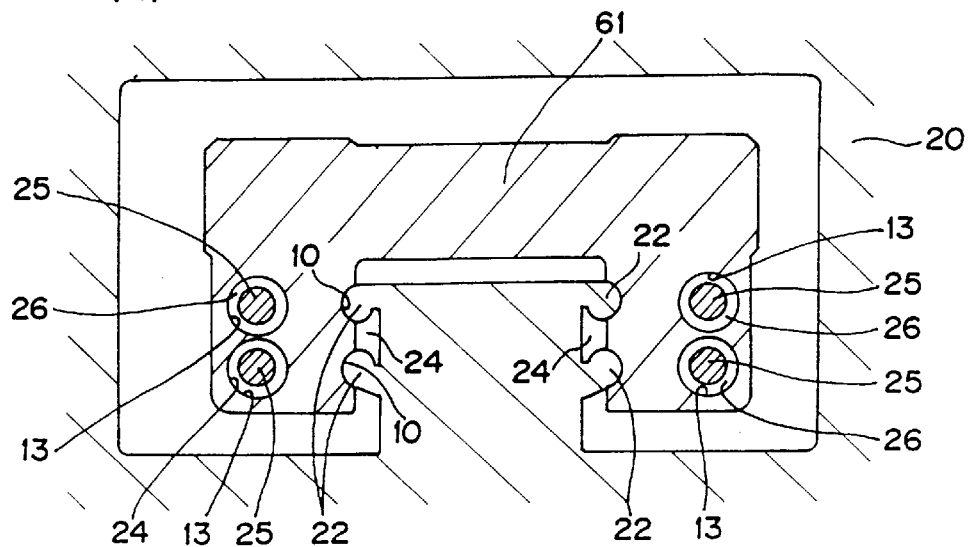
FIG. 3 is a view showing a shape-molding method of the movable block body.
Figure 3:
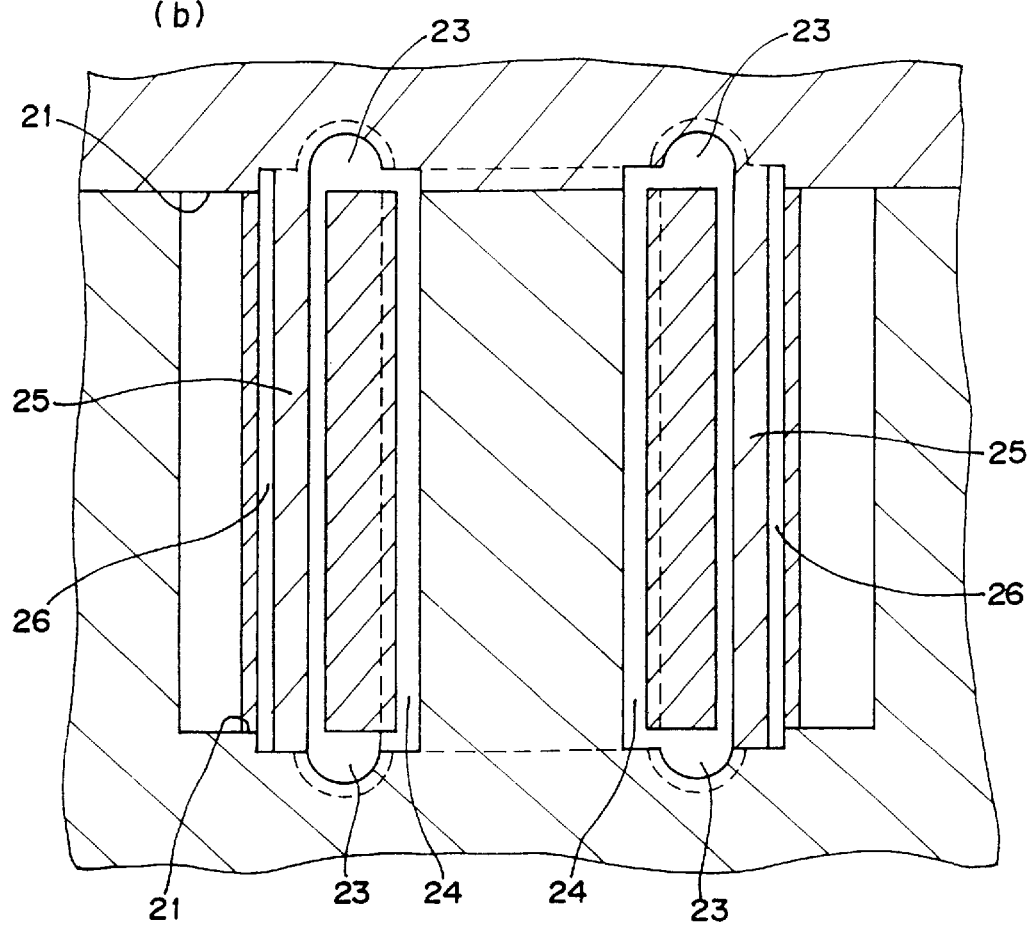

FIGS. 1 to 3 are views each showing one embodiment of a rolling motion guide apparatus according to the present invention.

In FIG. 1, a reference numeral 1 denotes an entire rolling motion guide apparatus which substantially comprises a track rail 2 as the track shaft and a movable block 4 as the movable member disposed to be movable on the track rail 2 through a ball row 3 consisting of a number of balls 3a as the rolling members.

The track rail 1 is an elongated member formed to provide a rectangular shape in section so that each of lateral right and left side surfaces of the track rail 1 is provided with two ball rows, respectively, i.e., totally four ball rows B1, B2, B3 and B4 through which the movable block 4 is guided. The right and left side surfaces of the track rail 1 are provided with four rows of loaded ball rolling grooves 5, 5, 5 and 5 as the loaded rolling member rolling portions corresponding to the four ball rows B1, B2, B3 and B4 so as to extend to an entire length of the track rail 4.

The movable block 4 comprises a movable block body 6 and a pair of end plates 7 constituting the direction changing passage member that are provided at both end portions of the movable block body 6. The movable block body 6 is composed of a block body having an inverted U-shaped cross-section and further comprises a horizontal portion 8 opposing to an upper surface of the track rail 2 and a pair of supporting leg portions 9 and 9 opposing to right and left side surfaces of the track rail 2. The inner side surfaces of the respective right and left supporting leg portions 9 and 9 are provided with loaded ball rolling grooves 10, 10, 10 and 10 corresponding to the loaded ball rolling grooves 5, 5, 5 and 5 formed to the right and left side surfaces of the track rail 2. Further, at the inner side surfaces of the respective right and left supporting leg portions 9 and 9, ball retaining portions 12 and 12 are provided between the loaded ball rolling grooves 5, 5 and 5, 5 so as to prevent the ball from dropping off therefrom when the movable block 4 is detached from the track rail.

Further, solid portions of the respective supporting leg portions 9 and 9 are provided with four rows of ball return passages 11, 11, 11 and 11 as the rolling member return passages extending in an axial direction for returning the ball from one end portion to the other end portion of the respective loaded ball rolling grooves 10, 10, 10 and 10. The ball return passages 11, 11, 11 and 11 are formed from pipe portions 14, 14, 14 and 14 as the return passage members which are bonded to the inner circumferential portions of the through bores 13, 13 13 and 13 formed to the respective supporting leg portions 9 and 9.

On the other hand, the end plate 7 is also formed to have an inverted U-shaped cross-section corresponding to the shape of the movable block body 6 and is provided with ball direction changing passage 15, 15, 15 and 15 for scooping up the balls 3a from the loaded ball rolling grooves 10, 10 10 and 10 and then guiding the balls 3a to the ball return passages 11, 11, 11 and 11. The end plate 7 is provided with outer periphery guide portions 15a, 15a, 15a and 15a of the ball direction changing passages 15, 15, 15 and 15. The ball direction changing passage 15 is constructed by fitting the end plate 7 to the round piece portions 16 and 16 provided with inner periphery guide portions at the end surface of the movable block body 6.

In this regard, as shown in FIG. 2, the ball retaining portions 12 and 12 to be formed at side peripheral portions of the loaded ball rolling grooves 5, 5, 5 and 5, the round piece portions 16 and 16 as the direction changing passage inner periphery guide portions and the pipe portions 14, 14, 14 and 14 as the rolling member return passage member are integrally formed to the movable block body 6 by inserting the movable block body 6 into a molding die. In this case, the die-molding operation can be performed by utilizing a resin molding method or a die-casting molding method using aluminum material or the like.

In addition, boundary portions between each of the round piece portion 15, the ball retaining portion 12, the pipe portion 14 and the movable member body 6 are limited to portions between the end surface 61 of the movable member body 6 and the round piece portions 15 and 16 as the direction changing passage inner periphery guide portion and between the ball rolling grooves 10, 10, 10 and 10 and the ball retaining portions 12 and 12.

Accordingly, the countermeasure against the burrs is required for only the portions of the end surface 61 of the movable member body 6 and the ball rolling grooves 10, 10, 10 and 10, so that an accuracy in dimension is not required for a portion between a side surface opposing to the side surface of the movable member body 6 to which rolling member rolling groove 10, 10, 10 and 10 are formed and the molding die. In this case, the round piece portions 16 and 16 provided at both end portions of the movable member body 6 are connected to the pipe portions 14, 14, 14 and 14 through the ball retaining portions 12 and 12, so that the round piece portions 16 and 16 are not detachable therefrom.

Further, as shown in FIG. 3, a method of manufacturing a movable block 4 for the rolling motion guide apparatus of the present invention comprises the steps of forming a through bore 13 for forming the ball return passage 11 at the movable block body 6 and supporting the the movable block body 6 within a first and a second molding dies 201 and 202 with reference to both the end surfaces 61 and the rolling member rolling grooves 10 of the movable block body 6, and setting each of contact conditions between the end surface 61 of the movable block body 6 and the end surface supporting portions of the molding dies 201 and 202, and between the ball rolling groove 10 of the movable block body 6 and a ball rolling groove supporting portion 22 of the first molding die 201 to a contact condition enabling to shut off a circulation of a fluidized resin material therebetween.

In this regard, the respective members are not required to be completely close-contacted to each other. As far as gaps of portions between the respective members are small enough, the circulation of the resin material can be shut off, so that a gap enabling to shut off the circulation shall be allowed. Both the end surfaces 61 and 61 can be securely shut off the resin circulation by a mold clamping force of the first and second molding dies 201 and 202.

Then, a cavity 23 for forming the round piece portion 16 as the direction changing passage inner periphery guide portion is formed at a portion between both the end portions 61 and 61 of the movable block body 6 and the end surface supporting portions 21 and 21 of the first and second molding dies 201 and 202, a cavity 24 for forming the ball retaining portion 12 is formed at the ball rolling groove 10 of the movable block body 6 and the side periphery portion of the ball rolling groove supporting portion 22 of the first molding die 201 and a cavity 26 for forming the ball return passage 11 at a portion between a core pin 25 to be inserted into the through bore 13 of the movable block body 6 and the inner periphery portion of the through bore 13.

The respective cavities described above are communicated with each other. When the molding material is injected into the respective cavities 23, 24 and 26, the round piece portion 16, the ball retaining portion 12 and the pipe portion 14 constituting the ball return passage 11 are integrally formed to the movable block body 6.

[Other Embodiments]

Next, the other embodiments of the present invention will be explained hereunder. Notes, in the following explanations, only the points different from those of the aforementioned embodiment will be explained. Namely, detailed explanations regarding to the same constitutional elements or parts as those in the aforementioned embodiment will be omitted by adding the same reference numerals to the corresponding elements or parts.

Figure 4:
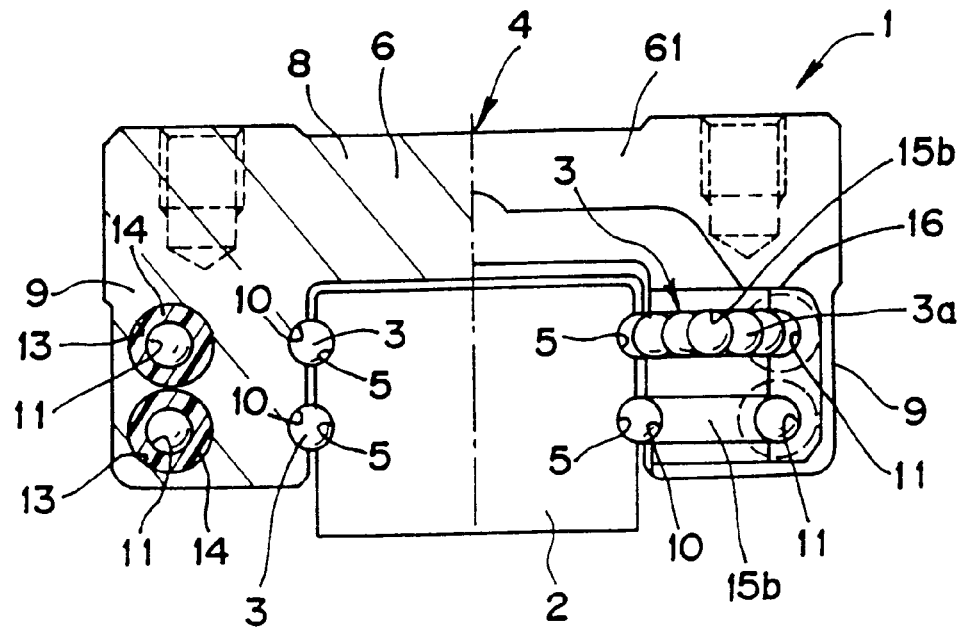
Figure 4:
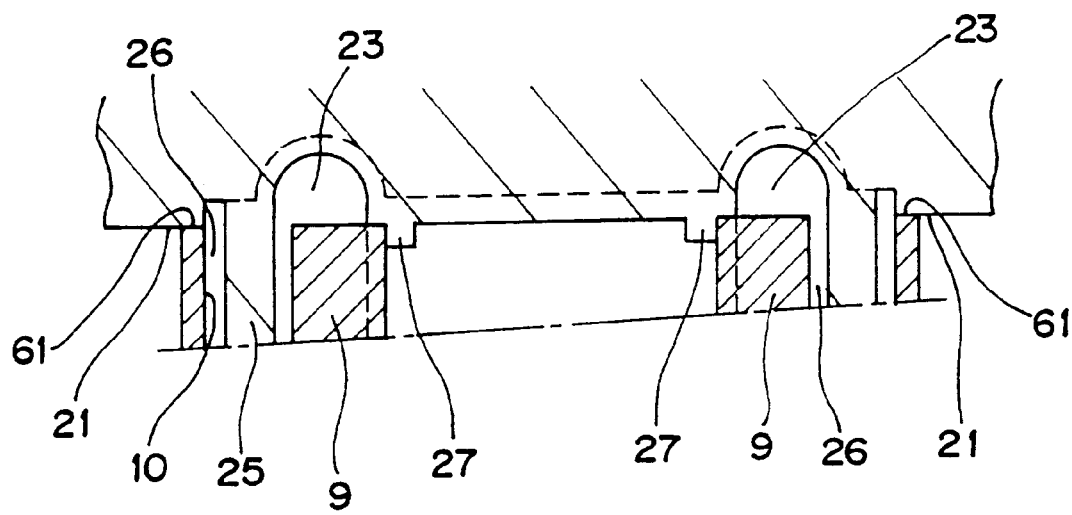

A mode of an embodiment shown in FIG. 4 shows a case where the ball retaining portion 12 is not provided to a side peripheral portion of the ball rolling groove 10 of the movable block body 6.

Namely, in this embodiment, the boundary portion between the round piece portion 16 to be die-molded and the movable block body 6 is limited to portions i.e., a portion between the end surface of the movable block body 6 and the round piece portion, and a portion between both the end portions of the ball rolling groove 10 and the round piece portion 16.

According to the structure described above, the portion to be required to take the countermeasure against the burrs is limited to only the end surface of the movable block body 6 and both the end portions of the ball rolling groove 10. As a result, the number of portions required for pressing the movable block body can be reduced in comparison with that of the afore-mentioned embodiment. At the time of the mold-shaping operation, as shown in FIG. 4(*b*), when a groove end supporting portion 27 for supporting only a groove end of the ball rolling groove 10 is provided, the formation of the burrs of the molding material to the ball rolling groove 10 can be prevented. As a matter of course, a ball rolling groove supporting portion 22 for supporting the ball rolling groove can also be provided in the entire length of the ball rolling groove 10.

In this case, the round piece portion 16 provided at both end portions of the movable block body 6 is connected by the pipe portion 14 for forming the ball return passage member, so that the round piece portion is not detachable therefrom.

Figure 5:
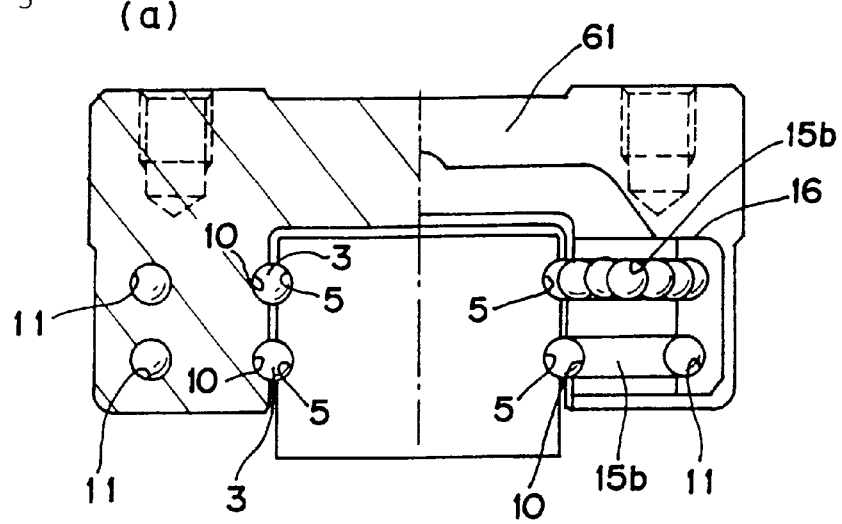
Figure 5:
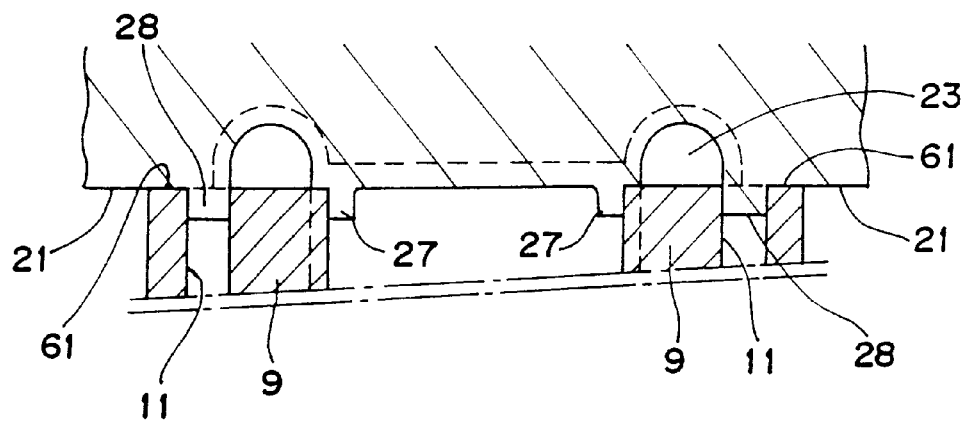
Figure 5:
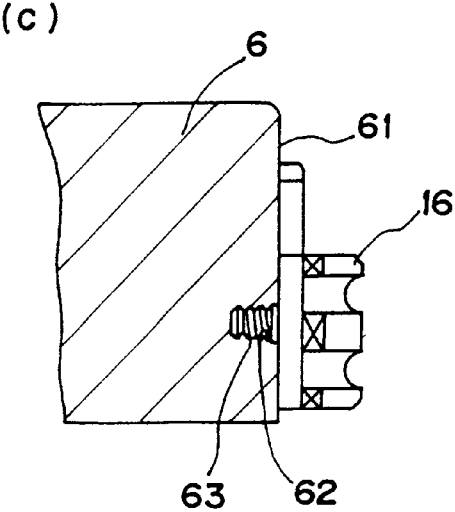

Further, a mode of an embodiment shown in FIG. 5 shows a case where the ball retaining portion 12 is not provided at a side peripheral portion of the ball rolling groove 12 of the movable block body 6 and the ball return passage 11 is not formed by mold-shaping. The apparatus is characterized in that the boundary portion between the round piece portion 16 and the movable block body 6 is limited to portions i.e., a portion between the end portion 61 of the movable block body 6 and the round piece portion 12, a portion between both the end portions of the ball rolling groove 10 and the round piece portion 16, and a portion between both the end portions of the ball return passage 11 and the round piece portion 16.

According to the structure described above, the portion to be required for taking the countermeasure against the burrs is limited to the portions of the end surface of the movable block body 6, both the end portions of the ball rolling groove 10 and both the end portions of the ball return passage 11.

That is, at the time of die-molding operation, as shown in FIG. 5(*b*), when a groove end supporting portion 27 for supporting only the groove end of the ball rolling groove 10 and a passage end supporting portion 28 for supporting a passage end portion of the ball return passage 11 are provided, the molding material can be prevented from flowing into the ball rolling groove 10 and the ball return passage 11, so that the formation of the burrs due to the molding material to the ball rolling groove 10 can be prevented.

In this case, as shown in FIG. 5(*c*), when the round piece portion 16 is constructed so that both end surfaces 61 of the movable block body 6, to which the round piece portion 16 is bonded, are provided with an engaging hole 62 while the round piece portion 16 is provided with an engaging convex portion 63 for locking which is formed from a molding material flowing into the engaging hole 62, the dropping-off of the round piece portion 16 can be prevented.

In particular, when the engaging hole 62 is formed to be a screwed hole having a thread groove formed to an inner periphery portion of the screwed hole while the engaging convex portion 63 is formed to have a male thread groove with which the thread groove of the screwed hole is engaged, the prevention of the dropping-off can be further secured.

By the way, although the embodiments have been explained by exemplifying the linear motion guide apparatus as the rolling motion guide apparatus, the present invention is not limited to those embodiments, and it should be understood, as a matter of course, that the present invention is also generally applicable to various rolling motion guide apparatuses in which a movable member is movably assembled to a guide shaft through various rolling members such as ball spline, ball bush or the like.

According to the present invention described above, the portion requiring for the countermeasure against the burrs is limited to only the end surface of the movable member body and the rolling member rolling groove portion, while an accuracy in dimension is not required for a portion between a side surface opposing to the side surface of the movable member body to which rolling member rolling groove is formed and the molding die. Therefore, the preparation of the movable member body and the molding die can be simplified, so that a productivity of the apparatus can be increased.

In addition, according to the method of manufacturing the movable member of the present invention, the movable member body portion is supported by the end surface of the movable member body and the rolling member rolling portion, and each of the positions of the rolling member retaining portion, the direction changing passage inner periphery guide portion and the rolling member return passage are determined with reference to the rolling member rolling portion. Therefore, each of the joint portions between the rolling member rolling portion and the direction changing passage inner periphery guide portion and between the direction changing passage and the ball return passage can be formed as continuous surfaces each having no difference in level, so that smooth circulation and movement of the rolling member can be effectively achieved.

Industrial Applicability

As described above, the rolling motion guide apparatus and the method of manufacturing the movable member for the apparatus according to the present invention are effective to the linear motion guide apparatus in which a movable member is movably assembled to a guide shaft through various rolling members such as linear ball guide device, ball spline, ball bush or the like, and particularly effective to apparatus in which a resin molded portion is integrally formed to the movable member body.

What is claimed is:

1. A rolling motion guide apparatus comprising a track shaft and a movable member movably disposed on said track shaft through a number of balls, wherein said movable member comprises: a movable member body having a loaded rolling member rolling portion corresponding to a loaded rolling member rolling portion formed on said track shaft and a rolling member return passage for returning the balls from one end of said loaded rolling member rolling portion to the other end thereof; and a direction changing passage member provided at both end portions of said movable member body, said direction changing passage member constituting a rolling member rolling direction changing passage for scooping up the balls from said loaded rolling member rolling portion and then guiding the balls to said rolling member return passage, wherein a rolling member retaining portion, a direction changing passage inner periphery guide portion and the rolling member return passage constituting portion to be provided at side peripheral portions of said loaded rolling member rolling portion are integrally formed to said movable member body by inserting said movable member body into a molding die, wherein said rolling member return passage constituting portion is integrally formed to an inner peripheral portion of a through bore formed so as to penetrate said movable member body, and wherein boundary portions between each of said rolling member retaining portion, said direction changing inner periphery guide portion, said rolling member return passage constituting portion and the movable member body are limited to a boundary portion between an end portion of the movable member body and said direction changing passage inner periphery guide portion and a single boundary portion between said rolling member rolling portion and said rolling member retaining portion.

* * * * *